(12) United States Patent
Rendina et al.

(10) Patent No.: US 7,862,707 B2
(45) Date of Patent: Jan. 4, 2011

(54) LIQUID FUEL FEEDSTOCK PRODUCTION PROCESS

(76) Inventors: David Rendina, 967 Heritage Blvd., North Vancouver, BC (CA) V7J 3G6; Edward G. Hauptmann, 3870 Sharon Drive, West Vancouver, BC (CA) V7V 2N3

( * ) Notice: Subject to any disclaimer, the term of this patent is extended or adjusted under 35 U.S.C. 154(b) by 523 days.

(21) Appl. No.: 12/071,100

(22) Filed: Feb. 15, 2008

(65) Prior Publication Data

US 2008/0209797 A1 Sep. 4, 2008

Related U.S. Application Data

(60) Provisional application No. 60/890,488, filed on Feb. 18, 2007.

(51) Int. Cl.
 *C10L 1/00* (2006.01)
(52) U.S. Cl. .................. 208/131; 208/283; 208/284; 208/286; 208/288
(58) Field of Classification Search .............. 208/131, 208/226, 230, 283–288
See application file for complete search history.

(56) References Cited

U.S. PATENT DOCUMENTS

| | | | |
|---|---|---|---|
| 2,517,177 A | 8/1950 | Carter | |
| 2,730,488 A | 1/1956 | de Rosset et al. | |
| 2,774,663 A | 12/1956 | Kirk | |
| 2,905,595 A | 9/1959 | Berg | |
| 2,930,689 A | 3/1960 | McGriff | |
| 3,161,584 A | 12/1964 | Gleim | |
| 3,252,774 A | 5/1966 | McMahon et al. | |
| 3,387,942 A | 6/1968 | Habermehl et al. | |
| 3,696,166 A * | 10/1972 | Ozawa et al. | 585/635 |
| 3,786,138 A | 1/1974 | Shalit et al. | |
| 3,850,742 A * | 11/1974 | Dugan et al. | 208/114 |
| 3,948,759 A | 4/1976 | King et al. | |
| 3,971,653 A | 7/1976 | Cochran | |
| 4,012,457 A * | 3/1977 | Bredeson et al. | 585/635 |
| 4,769,129 A | 9/1988 | Barbou des Courieres et al. | |
| 4,804,459 A | 2/1989 | Bartholic et al. | |
| 5,645,615 A * | 7/1997 | Malone et al. | 48/92 |
| 5,853,565 A | 12/1998 | Cayton | |
| 5,954,949 A | 9/1999 | Ohsol et al. | |

* cited by examiner

*Primary Examiner*—Robert J Hill, Jr.
*Assistant Examiner*—Brian McCaig

(57) ABSTRACT

A process for converting feedstock into liquid hydrocarbon fuel condensate includes the steps of providing an unconventional feedstock for producing liquid hydrocarbon fuel, providing a heated heat transfer medium flowing through at least one thermal reaction zone under substantially carbon rejection process conditions and placing the feedstock onto the heated heat transfer medium flow so that the feedstock substantially rides on the flow surface of the heated heat transfer medium without substantially any mixing of the feedstock with the heat transfer medium, vaporizing at least a portion of the feedstock to form vapours while the feedstock is in the thermal reaction zones by heat transfer to the feedstock from the heat transfer medium and condensing the vapours into a liquid hydrocarbon fuel condensate.

67 Claims, 2 Drawing Sheets

LIQUID FUEL FEEDSTOCK PRODUCTION PROCESS

CROSS REFERENCE TO RELATED APPLICATION

This application claims priority from U.S. Provisional Patent Application No. 60/890,488 filed Feb. 18, 2007 entitled Hydrocarbon Conversion Process.

FIELD OF THE INVENTION

This invention relates to the field of material processing for the production of liquid hydrocarbon fuels, and in particular to a process for the production of liquid hydrocarbon fuel from unconventional feedstocks.

BACKGROUND OF THE INVENTION

Materials that are typically processed into liquid hydrocarbon fuels, such as so-called light sweet crude oil, are becoming rare. The worldwide demand for materials that may be converted into liquid fuels will increasingly be met by resources such as low quality heavy sour crude oils, coal, oil shale, and biomass. The production and conversion of each of these new resources into materials that sufficiently resemble light sweet crude oil so that they may be transported to and processed in oil refineries presents unique challenges.

For example, it is well known that there are hundreds of billions of barrels of extra heavy crude oil deposits in the western hemisphere. Surface mining techniques may be applied to recover a portion of these deposits however, to mobilize the majority of these underground deposits so that they may be recovered at the surface it is believed that thermal processes such as steam flooding, or steam assisted gravity drainage must be applied. Methods currently employed to produce steam on-site usually burn expensive natural gas and produce unacceptably large quantities of greenhouse gases. The oil from these deposits must be diluted with lighter hydrocarbons once at the surface, or thermally upgraded to become a lighter hydrocarbon in order to prevent it from returning to a semisolid state that cannot be transported by pipeline to a refinery.

Thermally upgrading the heavy crude oil in the field has been a difficult process to perform on a practical basis largely because the crude oils often contain a high percentage of heavy metals and salt that damage process equipment, and conventional processes such as coking and hydrocracking require large, complex, energy and labor intensive systems that can only be operated economically on a large scale.

It would be beneficial to provide a field upgrading system that economically generates steam for heavy crude oil mobilization from heat sources that are not completely dependent on burning hydrocarbon fuels, and therefore produce less greenhouse gases. It would also be beneficial if the field upgrading process used systems that were tolerant to relatively large quantities of heavy metals and salt. Further, it would be beneficial if those systems could be intensified to a degree that allowed the crude upgrading steps to be completed in compact, easily deployed, modular units at the wellhead, or at the pre-pipeline crude oil collection and processing point.

Biomass is another unconventional resource that seems likely to play an increasing role as a feedstock for liquid fuel production. Most sources of biomass currently used as a feedstock for liquid fuel production are derived from materials such as corn, sugar cane, soybeans, and the like. These may also be valuable food products. Consequently, use of these food products as liquid fuel feedstock may increase the cost of food to consumers. Certain aquatic strains of microalgae would provide an excellent, non-food, feedstock alternative. Salt water microalgae strains have been identified as primarily the best candidates for conversion to liquid fuels however, it is difficult and expensive to completely remove all of the salt from the harvested microalgae.

It would be particularly beneficial if the microalgae could be grown on farms in the remote regions that are currently agriculturally unproductive, using locally available brackish or salt water sources. It would also be beneficial if the microalgae feedstock could be converted into relatively stable bio-crude oil using processes that were tolerant to relatively high concentrations of salt. In addition, it would be beneficial if the process used to convert the biomass into bio-crude could also produce an easily transported source of $CO_2$ to enhance the growth of the microalgae. It would be beneficial if the harvested product could be converted in relatively compact field processors that could be economically located near the farms in order to reduce transportation costs.

Crude oil processing equipment is usually produced currently on a one-off, custom manufactured basis. Although a compact field upgrading unit may not be particularly required for the conversion of coal or oil shale into liquid fuels, it would be beneficial if certain processing steps applied to one of these alternate resources could be universally applied to all of these alternate liquid fuel feedstock resources. Processing equipment for those universally applied steps could therefore be mass produced to reduce capital equipment costs for all of these resources.

The present invention includes four systems, namely, a system where catalyst is mixed with the feedstock prior to entering a thermal reaction zone, a system comprised of a thermal coking reaction zone where the heat is supplied to the admixed feedstock and catalyst by a flowing heat transfer medium, systems for converting the coke produced in the thermal reaction zones into gases, and systems for recovering and reusing the heat transfer medium and catalyst.

Bitumen, extra heavy sour crude oil, heavy sour crude oil, vacuum and residual bottoms are generally upgraded by processes that involve the use of thermal energy to crack long chain hydrocarbon molecules into smaller chain hydrocarbon molecules. These upgrading processes may be generally categorized as either carbon rejection processes as exemplified in U.S. Pat. No. 2,905,595 issued to Berg, or as hydrogen addition processes as exemplified in U.S. Pat. No. 4,804,459, issued to Bartholic et al, and the like. Carbon rejection processes are usually non-catalytic processes conducted at near atmospheric pressure conditions. The quality of liquid fuels produced by most carbon rejection processes are relatively unstable and require a further hydrogenation step to enhance stability. If a carbon rejection process was to be deployed in the field it would be beneficial if the quality of the liquids produced could be sufficiently stable to allow pipeline transportation without additional hydrogenation. Certain materials such as those described in U.S. Pat. No. 5,853,565, issued to Cayton are recognized coke promoters. The inventors have discovered that adding materials that are coke promoters (hereinafter referred to as coking catalysts) to a feedstock has the effect of lowering the temperature of the thermal cracking reaction and increasing the thermal cracking reaction rate. Residence time within the reactor may therefore be shorter, over-cracking is mitigated, and a higher quality, more stable liquid product is produced.

Hydrogen addition processes are usually catalytic processes conducted in a hydrogen atmosphere at high pressure.

Because these systems employ hydrogen under high pressure applicant believes they are unlikely to be employed as the main thermal process for upgrading in the field. However, hydrogen addition techniques may be employed in the field in some sub-systems such as hydrotreaters without departing from the spirit of the invention. A number of hydrogen addition processes that employ mixing catalyst or catalytic material precursors with the crude oil being processed have been suggested. These processes may be exemplified by process such as those described in U.S. Pat. No. 4,769,129, issued to Barbou des Courieres et al, and the like. Hydrogen addition processes that use molten alkali metal salts to catalyze or assist the upgrading of long chain hydrocarbons such as coal or heavy crude oil may be exemplified by U.S. Pat. No. 5,954,949 issued to Ohsol et al, and U.S. Pat. No. 3,948,759 issued to King et al, and the like. A problem inherent in all these processes, amongst others, is the complete recovery of all of the catalyst they employ. The cost of catalyst consumption is often one of the factors that prohibit the practical deployment of these processes.

The primary function of the catalyst in the present catalytic coking process is to promote the formation of coke, hence the use herein of the term coking catalyst. Unlike the hydrogen addition processes described above where the main function of the catalyst is to assist hydrogen to bond with a thermally cracked hydrocarbon. Surprisingly, many of the same materials like metal sulfides, especially molybdenum sulfides, that assist hydrogenation under typical hydrogen addition conditions of pressure, temperature, and atmosphere, conversely promote the production of coke under typical carbon rejection conditions. The inventors have found that certain water soluble metal salts such as sodium molybdate and sodium vanadate are highly effective as coking catalysts at the typically low or near atmospheric pressure conditions, and at somewhat lower temperature conditions than those employed in typical carbon rejection processes. This can be important if the current invention is applied to process certain feedstocks because many of them, such as extra heavy crude oils, often contain metals such as molybdenum, vanadium, and nickel that can be readily extracted by the process of the invention and converted into coke promoting catalyst. When processing a feedstock comprised in part of compounds containing these heavy metals the inventors believe that after an initial charge of catalyst, no additional catalyst may need be added. Further it is likely that eventually more catalyst precursors will be generated than are used in the process and that they will need to be systematically withdrawn to maintain steady state production.

One of the many problems inherent in typical carbon rejection processes is that the coke produced is difficult to handle and transport from the reaction zone. Methods for using molten salts to assist in the transport of coke from the reaction zone, and to insure that coke does not build up and stick to surfaces within the reaction zone have been described in a number of patents including for example U.S. Pat. No. 2,730,488 issued to de Rosset et al, and others. These patents describe systems where the coke is mixed with a molten salt, often an alkali metal hydroxide or alkali metal carbonate to assist with transport through the reaction zone. Other processes such as the Kellogg coal gasification process as described in full in the report entitled "Commercial Potential for the Kellogg Coal Gasification Process —1967", by Dr. George T. Skaperdas, posted at the web site http://www.fischer-tropsch.org/DOE/DOE_reports/180358/pb180358_toc.htm, disclose how molten salts may be used as both a heat transfer medium and a catalyst. The inventors have discovered that using a flowing molten salt as a heat transfer medium is beneficial, but mixing the molten salt with the hydrocarbon feedstock is ineffective as a means to inhibit coke sticking in the reaction zone, and is not desirable in the thermal cracking zone of the catalytic coking process of the present invention. Rather, the use of certain surface effects created between the heat transfer medium and the hydrocarbon feedstock are preferable.

Although it is undesirable to mix the heat transfer medium with the hydrocarbon feedstock in the thermal cracking zone of the present invention, a number of processes have been described for generating hydrogen through the catalytic reaction of a molten salt with carbon, including U.S. Pat. No. 3,387,942, issued to Habermehl et al, U.S. Pat. No. 3,252,774 issued to McMahon et al, and U.S. Pat. No. 2,517,177 issued to Carter. The use of the described processes or variation on these processes may be beneficially employed in the current invention after the catalytic coking process has been completed. U.S. Pat. No. 3,786,138 issued to Shalit et al, which is incorporated herein in its entirety by reference describes a process where carbon and water are catalyzed by a molten alkali metal salt at high temperature to produce hydrogen gas and further describes methods for recovering and reusing the alkali metal salt catalyst.

The U.S. Pat. No. 3,786,138 patent described above provides a method for recovering hydrogen gas from a catalyzed reaction between the coke and water. The process will also be particularly beneficial in certain cases, such as microalgae biomass growth and production facilities, as a $CO_2$ absorbent is inherently produced that can be transported to a site proximate to the biomass growth area before it is induced to release its $CO_2$ content. Due in part to the fact that insufficient steam is produced in the field by using the methods described in U.S. Pat. No. 3,786,138 (the "'138 patent"), methods to mobilize extra heavy or heavy crude oils by steam flooding or steam assisted gravity drainage or the "'138 patent" process of hydrogen production and catalyst recovery would not be generally preferred for those applications.

All carbon rejection processes produce a coke or carbon by-product that must be disposed of, burnt, sold, or partially converted into liquid fuels. Burning the coke by-product significantly increases the quantity of greenhouse gases produced by an upgrader and may be prohibited by law in many jurisdictions. Coke produced at remote locations from crude oils which are comprised in part of contaminating heavy metals are likely to be uneconomical to transport to markets that might wish to purchase them. Carbon gasification processes are described in the aforementioned Kellogg Company report by Skaperdas. Carbon gasification processes are typically combined with electrical generating systems that require complex equipment that is difficult to operate economically on a small scale. It would be beneficial if a carbon rejection process used in a field upgrader could be economically operated on a relatively small scale, and if all of the carbon rejected in the process could be converted into useful gases such as hydrogen and carbon monoxide.

One method for accomplishing the conversion of coke into useful gases that lends itself to modular construction techniques and ties in with byproducts of the inventors' catalytic coking process is the carbothermic reduction of the molten alkali metal salt with coke. The carbothermic reduction of alkali metals is a well known metallurgical process, and is described in a number of patents including U.S. Pat. No. 2,774,663 issued to Kirk, U.S. Pat. No. 2,930,689 issued to McGriff, and U.S. Pat. No. 3,971,653 issued to Cochran. When sodium hydroxide is used as the molten alkali metal salt heat transfer medium in the catalytic coking process of the present invention, the carbothermic reduction of the molten alkali metal hydroxide by the coke produces gases comprised in part of carbon monoxide, hydrogen, and sodium metal vapor.

Recovery of the sodium hydroxide heat transfer material can be accomplished by adding water in a controlled manner to react with the sodium vapor and release additional hydrogen gas. Carbon monoxide and hydrogen may be combined in the presence of a catalyst in well defined processes such as the Fisher-Tropsch process to form liquid fuels. The intensely exothermic reaction between sodium vapor and water has the additional benefit of providing significant quantities of high quality steam, without the production of greenhouse gases, which may be used in many field applications, such as for example, steam flooding, steam assisted gravity drainage, electricity production, and the like.

SUMMARY OF THE INVENTION

In Summary, the process according to the present invention for converting feedstock into liquid hydrocarbon fuel condensate may be characterized in one aspect as including the steps of:

a) providing a feedstock for producing liquid hydrocarbon fuel, wherein the feedstock is chosen from the group including in whole or in part: biomass, bitumen, crude oil, oil shale, tar, coal;

b) providing a heated heat transfer medium flow having a flow surface, the flow flowing through at least one thermal reaction zone under the substantially carbon rejection process conditions, c) placing the feedstock onto the heated heat transfer medium flow so that the feedstock substantially rides on the flow surface of the heated heat transfer medium flow without substantially any mixing of the feedstock with the heat transfer medium flow under the substantially carbon rejection process conditions, d) vaporizing at least a portion of the feedstock to form vapours while the feedstock is in the at least one thermal reaction zone by heat transfer to the feedstock from a heat transfer medium in the heat transfer medium flow, while leaving unvaporized by-products including an unvaporized remainder portion of the feedstock, e) condensing the vapours into a liquid hydrocarbon fuel condensate, f) collecting the condensate.

In one preferred embodiment the process further includes the steps of mixing a catalyst with the feedstock to produce an admixture and then placing the admixture, instead of placing the feedstock, onto the surface of the heated heat transfer medium flow, and recovering at least a portion of the catalyst from the unvaporized by-products, wherein, advantageously the catalyst is a coking catalyst to cause coking. In one embodiment, the coking catalyst is a particulate so as to flow with the feedstock in the admixture. Further advantageously, the catalyst and the feedstock include materials such as metals which are common between the catalyst and the feedstock so that at least one of the materials is found in both the catalyst and the feedstock In a further embodiment the process further includes the step of reacting in a thermo-chemical reaction at least a portion of the heat transfer medium and at least a portion of the remainder portion of the admixture so as to generate gas. Further yet, the process may include regenerating the heat transfer medium and returning the regenerated heat transfer medium for feeding into an upstream end of a thermal reaction zone as at least a portion of the heat transfer medium flow.

In an additional step, if the feedstock is initially in a solid state, then the process further includes converting the feedstock to a slurry prior to the step of placing the admixture onto the heat transfer medium, wherein the step of converting the feedstock to a slurry may include converting the feedstock to a fine particulate and adding liquid organic material. Advantageously, the placing of the admixture onto the heat transfer medium may include applying the admixture as a flow, wherein the flow includes applying the admixture as droplets, dust or at least one stream.

The coking catalyst may be chosen from the group comprising water soluble salts, oil soluble salts, alkali metal salts, metal salts, metal oxides, metal sulfides, metal nitrides, metal carbonates, metal organic compounds, and mixtures thereof. In one embodiment the group may be restricted to alkali metal salts, metal organic compounds, and metal salts. For example, the metal salts may include molybolenum, nickel, and vanadium compounds, and the coking catalysts which are recovered may be, respectively, sodium molybolate, sodium vanadate, nickel oxide, and the recovered catalyst then added to the feedstock as recycled feedstock.

The materials such as metals which are common to both the admixture and the feedstock may be recovered from the admixture following the vaporizing of at least a portion of the feedstock in the admixture. After the recovery, the materials in the coking catalyst may be recycled for re-use in the admixture in the placing of the admixture onto the heated transfer medium flow.

The mixing step may be done under temperature conditions in the range of substantially zero degrees Celsius to 200 degrees Celsius, and is under pressure conditions in the range of substantially zero psia to 100 psia. The steps of placing and vaporizing in the at least one thermal reaction zone may be performed in the temperature range of substantially 300 degrees Celsius to 600 degrees Celsius, under pressure in the range of substantially 5 psia to 100 psia. In one embodiment of the process, the temperature range is substantially 380-450 degrees Celsius, and the pressure range is substantially 5-30 psia.

The heat transfer medium may include molten alkali metal salts. The molten alkali metal salts may be chosen from the group comprising alkali metal hydroxies, alkali metal nitrides, alkali metal carbonates, alkali metal chlorides, eutectic mixtures of alkali metal salts. The heat transfer medium may include primarily sodium hydroxide. The heat transfer medium may be comprised in part of molten alkali metal carbonate. The molten alkali metal carbonate may be sodium carbonate.

The at least one thermal reaction zone may include in one embodiment a substantially horizontal, which is not intended to be limiting as other inclinations would work, first thermal reaction zone having an upstream end and an opposite downstream end, wherein the admixture is dropped as a substantially continuous flow onto the heat transfer medium flow at the upstream end and travels on the upper flow surface downstream to the downstream end. The dropping of the admixture as a continuous flow may include dropping the admixture as drops, dust or as at least one stream.

The at least one thermal reaction zone may include a second thermal reaction zone downstream of and cooperating with the first thermal reaction zone for accepting heated the admixture from the downstream end of the first thermal reaction zone, and wherein, when the feedstock is primarily biomass, the second thermal reaction zone is heated to a temperature range of substantially between 400 and 900 degrees Celcius. In one embodiment of the process, the temperature range in the second thermal reaction zone is between 750 and 850 degrees Celcius.

In one embodiment of the process, the at least one thermal reaction zone includes a succession of thermal reaction zones cooperating with one another for transporting downstream consecutively therethrough the admixture and the heat transfer medium, and wherein, in a downstream thermal reaction zone downstream of an upstream-most thermal reaction zone, the admixture and the heat transfer medium are mixed together and heated to create a carbothermic reduction reaction. In that process, the heat transfer medium may include that chosen from the group comprising molten metals and molten alkali metal salts, and wherein the downstream thermal reaction zone is heated to a temperature range of substantially 900 to 1200 degrees Celcius so as to create hydrogen, carbon monoxide and alkali metal vapour. In one embodiment of that process, the temperature range is 1000-1190 degrees Celcius.

The process may further include the step of generating heat in a further recovery zone, wherein the alkali metal vapour is removed to the further recovery zone and reacted with water, and wherein the heat may be used to produce steam. The reaction with water creates hydrogen gas. The downstream thermal reaction zone may create further hydrogen gas and carbon monoxide gas. The process may then include the further step of evacuating the hydrogen gases and carbon monoxide gas to a Fisher-Tropsch reactor and converting therein the gases to liquid fuel.

DETAILED DESCRIPTION OF EMBODIMENTS OF THE INVENTION

Figure 1:
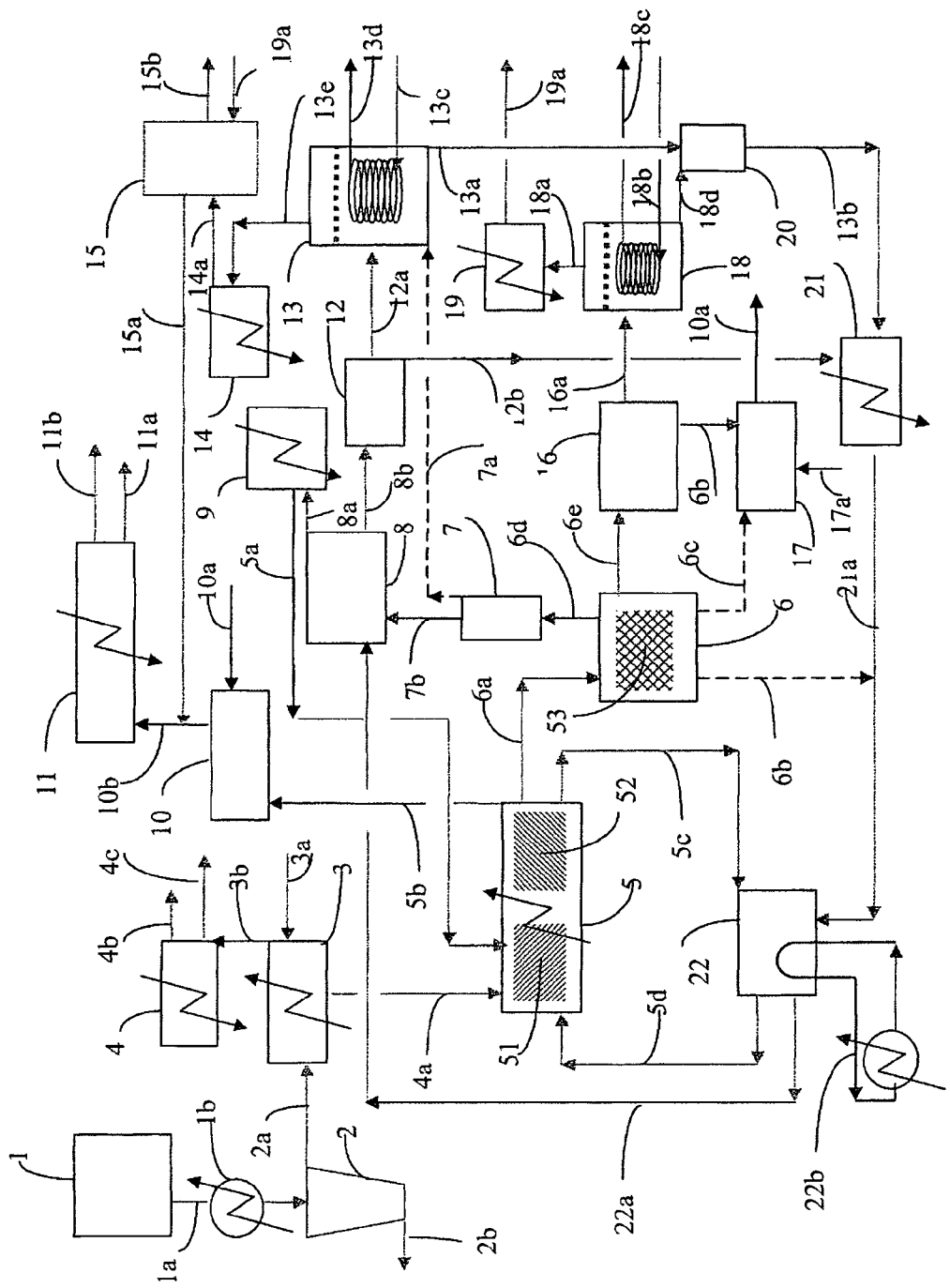
FIG. 1 is a diagrammatic illustration of the elements of one embodiment of the process according to the present invention.

The present invention describes a continuous process that employs systems that may be universally applied to process many feedstocks that may be used as supplements or replacements for light sweet crude oil in the production of liquid fuels. The systems may be used to convert biomass into biocrude by fast pyrolysis, or for "upgrading" hydrocarbons such as crude oil, bitumen, vacuum and residual bottoms, oil shale, coal, and the like into short chain, lighter, sweeter hydrocarbon materials that have physical and chemical properties similar to light, sweet crude oil. It is especially preferred for use in mobilizing and upgrading bitumen, extra heavy sour, and heavy sour crude oil prior to shipment to a refinery.

The inventors disclose a process that is comprised in part of four systems, namely, a system where catalyst is mixed with the feedstock prior to entering a thermal reaction zone, a system comprised of a thermal coking reaction zone where the heat is transferred to the admixed feedstock and catalyst from a flowing heat transfer medium, systems for effecting a chemical reaction between components of the heat transfer medium and the coke produced in the thermal reaction zone to produce gases, and systems for recovering and reusing the heat transfer medium and catalyst.

The process employs a number of steps. These steps are described in FIG. 1 which depicts an example of the elements of a preferred iteration of the process. Those skilled in the art will understand that the steps depicted are intended to be illustrative of the process rather than descriptive of the specific equipment or equipment configurations that would be used, that sub-systems may be added to or subtracted from process to achieve a desired end product, and that a number of steps depicted may in practice be combined in a single piece of equipment.

In the first step, a material known to promote the production of coke, hereinafter referred to as a coking catalyst, selected from the group comprised in part alkali metal salts, metal salts, metal oxides, metal sulfides, metal nitrides, metal carbonates, metal organic compounds, and mixtures of the same, are mixed with a feedstock selected for conversion from the group biomass, bitumen, crude oil, oil shale, tar, and coal. If the selected feedstock is to be processed while initially in a solid state, such as coal or oil shale, it is preferred that the solid feedstock is mixed as a fine particle with liquid organic material to form a slurry prior to its entry into the thermal reaction zone. It is preferred that the coking catalyst be primarily comprised of materials recovered from a step described below. It is also preferred that the coking catalyst be comprised in part of water or oil soluble salts, selected from the group alkali metal salts, metal organic compounds, and metal salts. Crude oils often contain molybdenum, nickel, and vanadium compounds, and if these materials are already contained in the selected hydrocarbon then after an initial charge of catalyst is supplied to the material reaction chain, they preferably comprise a portion in the range of 0.01% to 100% of the catalyst employed in the process. If these materials are recovered as a result of a step in the process it is preferred that they be added to the feedstock in the form of water soluble salts or metal oxides, such as sodium molybdate, sodium vanadate, and nickel oxide.

Further, it is preferred that the catalytic material is unsupported or supported by small quantities of materials such as carbon or carbides in a manner that they behave as though they were liquefied, that is, the particles of catalytic materials should be small enough that they do not inhibit the flow of the selected feedstock. It is preferred that the catalytic materials be added to and thoroughly mixed with the selected feedstock under temperature conditions that range from 0 C to 200 C and pressure conditions that range from 0.01 psia to 100 psia. If the catalyst material or catalyst precursor materials are dissolved in or suspended in water a de-watering step may be employed after they are mixed with the feedstock.

The ratio of materials that comprise the coking catalyst materials may vary considerably throughout the process, and may be determined in part by the type and quantity of metals recovered as a result of the process. For example, if a selected feedstock is comprised in part of a high relative proportion of vanadium and nickel, then those metals may form a larger proportional ratio in the catalytic-coking materials than materials which comprise a smaller relative proportion.

It is the inventors' intent that substantially all of the coking catalyst material used in the process be recovered for use by certain steps of the process. However, the composition of material recovered by the steps of the process and mixed with the feedstock need not be purely comprised of catalytically active material. A substantial portion of material that may have been recovered by steps in the process that do not have a catalytic effect such as for example, quantities of sodium chloride or sodium carbonate, may be added with the catalyst to the feedstock without necessarily effecting the conversion of the feedstock in a negative way.

After the catalyst mixing step, one of the next steps of the present invention may be described as a catalytic coking step, wherein the feedstock selected for conversion is heated in thermal reaction zone 1, shown as shaded region 51 within hydrocarbon reactor 5, to temperatures preferably in the range of 360 C to 600 C and most preferably in the range of 380 C to 450 C, under low pressure conditions, preferably in the range of 13 psia to 100 psia and most preferably in the range of 5 psia to 30 psia, by dropping the selected feedstock admixed with catalyst in controlled amounts as small drops onto the surface of a flowing heat transfer medium in a thermal reaction zone, in a manner whereby the drops of feedstock enter one end of the reaction zone and travel on the surface of the flowing heat transfer medium to the opposite end of the reaction zone. The inventors have observed that heat transferred from the heat transfer medium to the drops of the selected feedstock appears to be very rapid and that the drops appear to ride on a cushion of vapor evolved from the feedstock above the surface of the flowing heat transfer medium. It is believed that in large part, the reactions between the heat transfer medium and the drops of feedstock are limited to the transfer of heat, and that very little if any chemical reaction occurs between the heat transfer materials and the feedstock at this stage of the process. It is important that the design of the thermal reaction zones accommodate the evolution of vapor from the feedstock in such a manner as to inhibit a build up of excess pressure in the reaction zone. It is preferred that any gases produced be removed from the thermal reaction zones as they are produced.

It is also believed that as the drops of feedstock mixed with catalyst become smaller as they travel through the first thermal reaction zone, and that as the catalyst material is not converted to gases in this zone, the relative concentration of catalyst to feedstock in each drop becomes greater as drops of feedstock become smaller and hotter. It is further believed that the components of the feedstock that remain in the small drops at the end of the first thermal reaction zone are largely those components that are assisted most by the presence of the catalyst and therefore these materials are thermally cracked more rapidly and at lower temperatures than are typical in standard carbon rejection processes. It is further believed that thermally cracking the feedstock at lower temperatures and shortening the residence time of the feedstock in the first thermal reaction zone, produces higher quality, more stable, liquid fuels from the gases that evolve when they are condensed.

The preferred heat transfer medium in the first thermal reaction zone is comprised in part of molten alkali metal salts, said salts may be selected from the group alkali metal hydroxides, alkali metal nitrides, alkali metal carbonates, alkali metal chlorides, and eutectic mixtures of alkali metal salts. It is most preferred that the selected material for use as a heat transfer medium in the first thermal reaction zone be comprised substantially of sodium hydroxide.

Although it is possible, as depicted in FIG. 1, to complete the required thermal reaction in the first thermal reaction zone when processing a light feedstock, particularly when processing a biomass feedstock, it is usually required that the feedstock be transported on the surface of the heat transfer medium into the second thermal reaction zone, shown as shaded area 52 within hydrocarbon reactor 5, where the feedstock is heated at temperatures between 400 C and 900 C, and preferably where the feedstock is heated to a temperature in the range of 750 C and 850 C in order to evolve any remaining volatile material. Hydrocarbon reactor 5 may be segregated into two chambers to better carry out the separate processes. As with gases evolved in the first thermal reaction zone, it is preferred that any gases that evolve in the second thermal reaction zone be removed from the reaction zone as they are evolved in order to inhibit any build up of excessive pressure in the reaction zone.

It is believed that processing at these temperatures will largely ensure that the composition of materials exiting the second thermal reaction zone will be substantially pure carbon, coking catalyst, and heat transfer medium. The inventors have found that any un-reacted feedstock that is to be transported from the first thermal reaction zone into the second thermal reaction zone, or for that matter from the second thermal reaction zone to a third thermal reaction zone, may be easily and substantially separated from the bulk of the heat transfer medium in each zone by the application of simple separation devices. For example, since the feedstock is typically traveling by gravity flow through a horizontally oriented reaction zone on the surface of a heat transfer medium at near atmospheric pressure, a simple weir may often be used to separate the un-reacted feedstock from the bulk of the heat transfer liquid in the zone prior to its entry into the next thermal zone.

Depending on the selected feedstock and specific application of the process, as in the description of how materials exiting the first thermal reaction zone may optionally be treated, the materials exiting the second thermal reaction zone may either have air, water, and optionally additional molten sodium hydroxide added to them to evolve hydrogen gas by known methods as depicted in FIG. 1, or they may be transported into the third thermal reaction zone as depicted in FIG. 1 as shaded area 53 within carbothermic reduction reactor 6. In the third thermal reaction zone, the heat transfer medium, carbon, and coking catalyst transferred from the second thermal reaction zone are thoroughly mixed together and heated to a point where a chemical reaction, carbothermic reduction, is effected between the molten salt and the coke transferred from the second thermal reaction zone. In this endothermic chemical reaction, carbon and the heat transfer medium are consumed and largely converted into carbon monoxide, hydrogen, and alkali metal vapor, typically sodium vapor. Temperatures in the third thermal reaction zone will be maintained in a range between 900 C and 1200 C and preferably materials within that reaction zone will be maintained at temperatures between 1000 C and 1190 C. The heat transfer medium in the third thermal reaction zone may be selected from the group, molten metals, and molten alkali metal salts. It is generally preferred that the heat transfer medium in the third thermal reaction zone be comprised in part of molten alkali metal carbonate, particularly sodium carbonate.

As in the first and second thermal reaction zones, it is preferred that any gases that evolve in the third thermal reaction zone be removed from the reaction zone as they evolve. Metal vapors, such as sodium metal vapors produced in the third thermal reaction zone will be evacuated to a heat transfer material recovery zone where the vapors are reacted with water in the form of steam in such a manner as to prevent a back reaction of sodium and other gases so that relatively pure alkali metal hydroxides, typically sodium hydroxide is produced and hydrogen gas is split from the water. It is preferred that the heat generated by this exothermic reaction be utilized to produce steam.

The hydrogen and carbon monoxide gases produced in the third thermal reaction zone and the hydrogen gas produced in the heat transfer medium recovery zone may be evacuated to a Fisher-Tropsch reactor and converted into additional liquid fuels. Alternatively, the hydrogen produced in the heat transfer medium recovery zone or a portion of the hydrogen produced may be diverted to the thermal reaction zones or to optional sub-systems, for example to a hydrotreater.

It has been observed that a significant portion of the coking catalyst remaining in the third thermal reaction zone will form on the surface of the molten heat transfer medium as a slag. It is preferred that a portion of the slag will be separated from the mass of the heat transfer medium remaining in the third thermal reaction zone and continuously withdrawn to a catalyst recovery zone 17, as shown in FIG. 1. In the catalyst recovery zone, first air is introduced to the high temperature slag to oxidize metals, then a quantity of water sufficient to dissolve any materials soluble in water is added, the resulting liquids are transported to a settling area where participates are collected and removed. The remaining liquids are comprised in part of the preferred coking catalyst of the present invention. They are mixed in measured amounts with the selected feedstock before it is delivered to the first thermal reaction zone.

Referring now in more detail to FIG. 1, the selected hydrocarbon is transferred from holding tank 1 through line 1a and heater 1b. Additional catalyst material or catalyst precursor material is added through line 3a to the selected hydrocarbon in mixer 3. The combined materials may optionally be dewatered in dewaterer 2, with dewatered material passing through line 2a to mixer 3, and water discharged through line 2b. Water vapor and hydrocarbon vapors generated as a result applying heat to mixer 3 pass through line 3b and are condensed in a condenser off mixer 4, with non-condensed hydrocarbon vapors exiting through line 4b, and the additional hydrocarbon liquids collected in line 4c.

The combined hydrocarbon and additional catalyst mixture is transferred through line 4a to hydrocarbon reactor 5. Temperature and pressure conditions in the first thermal reaction zone of hydrocarbon reactor 5 are maintained in the previously specified range of 360 C to 600 C and preferably between 380 C and 450 C. Hydrogen may be added through line 5a. The combined hydrocarbon and additional catalyst mixture enters hydrocarbon reactor 5 through a nozzle (not shown) as a stream that may form into droplets that are deposited onto the surface of a flowing liquid heat transfer medium. Materials suitable for use as heat transfer media include metals and metal salts with melting points below 500 C. It is preferred that the heat transfer medium is a metal salt and most preferred that the metal salt is sodium hydroxide (NaOH).

As the selected hydrocarbon flows through the first thermal reaction zone of hydrocarbon reactor 5 on the surface of the heat transfer medium it is thermally cracked. The inventors believe that the thermal cracking process occurs more quickly and more thoroughly under the described conditions in part as a result of the presence of the catalyst.

The added hydrogen and hydrocarbon vapors produced as a result of the thermal cracking are transferred through line 5b to catalytic sulfiding reactor 10. Sulfur compounds contained in the hydrocarbon vapors are stripped from the vapors by reactions in the catalytic sulfiding reactor 10. These reactions serve to simultaneously sweeten the hydrocarbon vapors and sulfide catalyst metals recovered in other steps of the process. The sweetened hydrocarbon vapors are transferred through line 10b to main condenser 11 where they are recovered as liquid hydrocarbons through line 11a or sent as non-condensed gases to un-shown scrubber for additional sulfur removal and vapor collection through line 11b. Non-condensed vapors may be combusted to provide process heat.

The thermally cracked hydrocarbon and catalyst mixture, now largely composed of coke, heavy metals, and high boiling point hydrocarbons is transferred to the second thermal reaction zone as previously described so that all remaining volatiles can be removed. The additional hydrocarbon vapors can be mixed with those in line 5b. In some cases it may be preferable to provide a separate vapor collection system, not shown, for the vapors from the second thermal reaction zone.

While a majority of the heat transfer medium is transferred through line 5c to NaOH tank 22 where it is heated and recycled back to hydrocarbon reactor 5 through line 5d a portion of the heat transfer medium that contains substantially all of the un-reacted hydrocarbon, catalyst, and coke produced as a result of the thermal cracking is transferred as a mixture through line 6a to carbothermic reduction reactor 6. It is possible and within the scope of the invention to allow the mixture to separate at this point, then transfer substantially clean heat transfer medium back to tank 22 through dotted line 6b, and to also transfer through line 6c the separated un-reacted hydrocarbon, catalyst, and coke to catalyst recovery system 17 where catalyst metals may be recovered from the coke by known methods such as adding air through line 17a.

It is preferred however, to heat the mixture while in third thermal reaction zone within carbothermic reduction reactor 6 in such manner as to cause a carbothermic reduction to occur. It is also preferred that said carbothermic reduction occurs in two stages. For example, if the selected heat transfer medium is NaOH, then the pressure in carbothermic reduction reactor 6 is maintained at approximately one atmosphere and the temperature is maintained within a range between 700 C and 900 C, although 800-850 C is preferred. Upon reaction sodium vapor, hydrogen, and other gases are produced and exit through line 6d. Reactions that may generate char and entrained particles may occur in vapor reactor 7. Vapors exiting vapour reactor 7 may be transferred directly to sodium reactor 13 through dotted line 7a where they may be stripped of impurities by reaction with steam to produce hydrogen and other gases, which may be further treated to remove sulfur in un-shown scrubber prior to conversion from gas to liquid, and NaOH. Alternatively they may be transferred through line 7b to vapor wash system 8.

In vapour wash system 8 the vapors and other materials recovered from vapour reactor 7 are preferably washed and cooled to a point below the vaporization temperature of sodium by a spray of heat transfer medium supplied through line 22a. The hydrogen and other gases pass through line 8a to vapor chiller 9 and are returned to hydrocarbon reactor 5 through line 5a. The char and previously entrained particles are transferred along with the now liquid sodium through line 8b to sodium boiler 12. The temperature and pressure in boiler 12 is maintained above atmospheric and within a range between 700 C and 900 C. Thus the materials are heated again and sodium liquids are again vaporized. Vaporized sodium is transferred through line 12a to sodium reactor 13 where it is optionally collected or reacted with steam to produce NaOH and hydrogen. Heat is removed by cooling coils entering Na reactor 13 through line 13c and leaving through line 13d. The recovered NaOH may be transferred through line 13a to NaOH recovery system 20 where it is dried and then passes through line 13b onto NaOH chiller 21 to be cooled. The residual un-vaporized materials from boiler 12 may be transferred through line 12b to NaOH chiller 21 where they are cooled before entering NaOH tank 22 through line 21a. Additional heat may be added to the process through an external heating circuit 22b.

Continuing with the example, in the second stage of the third thermal reaction zone, the residual carbonate and catalyst metals produced in reactor 6 are transferred through line 6e to sodium carbonate reactor 16. The temperature in reactor 16 is maintained between 900 C and 1500 C and preferably at least 1100 C. Here the reaction proceeds to produce sodium (Na) vapor and carbon monoxide (CO) gas, and residual metals and metal compounds pass through line 16b to catalyst recovery system 17. The Na vapor and CO gas are transferred through line 16a to Na reactor 18. Within reactor 18 Na vapor may be either cooled by cooling coils entering through line 18b and leaving through line 18c and collected as a liquid or reacted with steam to produce NaOH and hydrogen. The NaOH passes through line 18d to the recovery system 20. Hydrogen and CO exiting from reactor 18 through line 18a and hydrogen exiting from reactor 13 through line 13e may be cooled in chillers 14 and 19 respectively prior to being transferred through lines 14a and 19a to gas-to-liquids system 15 where they are converted by known methods into liquid hydrocarbons. Excess CO may be sent through line 15a to main condenser 11, while valuable liquids produced leave through line 15b. The heat of reaction generated by the Na and steam may be recovered for process or other uses.

Catalytic metals and catalyst precursors derived from catalyst recovery system 17, which may be supplied with air through line 17a, are transferred to catalyst sulfiding system 10 through line 10a. In system 10 the metals and precursors are exposed to hydrocarbon vapors containing sulfur compounds at elevated temperatures. This exposure results in sulfur being removed from the hydrocarbon vapors and a portion of the metals and precursors are converted into metal sulfide catalysts. For example sodium molybdate may be recovered from system 17. When this precursor is exposed to hydrocarbon vapors at 450 C it reacts to become sodium sulfur compounds and molybdenum sulfide ($MoS_2$) catalyst. These materials may be separated for example, by adding water to dissolve the sodium sulfur compounds and precipitate the $MoS_2$ as finely divided particles in suspension.

Figure 2:
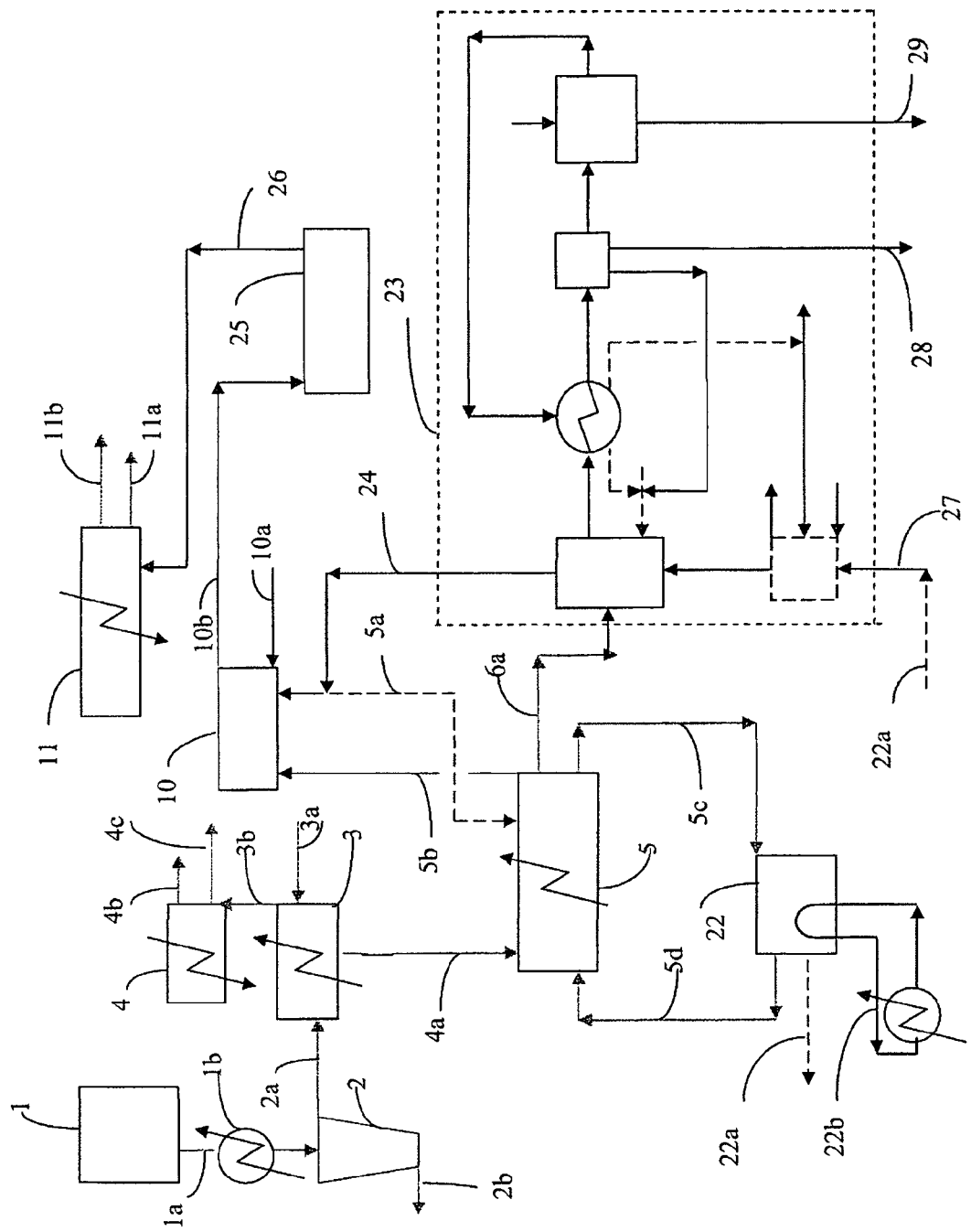
FIG. 2 is a diagrammatic view of a simplified arrangement of the process of FIG. 1, including a prior art recovery system.

The coke produced by the thermal cracking in reactor 5 may be alternately converted to useful hydrogen and additional energy by transferring the mixture of coke, heat transfer medium, unreacted hydrocarbons and catalyst through line 6a to a recovery system fully described in U.S. Pat. No. 3,786,138 issued to Shalit et al, incorporated herein by reference and shown within the dotted box 23 in FIG. 2. The mixture in line 6a enters into system 23, where it is processed as taught in the '138 patent. High-purity hydrogen is produced and returned through line 24 to catalytic sulfiding reactor 10, whereby upon treatment as previously described it passes through line 10b to hydrotreating system 25 before being sent through line 26 to main condenser 11. Hydrotreating system 25 employs well-known catalytic hydrogenation processes described in "Handbook of Petroleum Refining Processes, Part 14, Meyers, R. A., McGraw-Hill (2003), and results in improvements to final liquid product grade, heating value and stability following cooling in main condenser 11. Additional benefit is discussed in the '138 patent by adding a molten alkali metal hydroxide into system 23 though line 27, which may conveniently be taken from the main heat transfer system 22 through line 22a. Various ash components described in the '138 patent leave system 23 through line 28, while a metal carbonate is discharged through line 29. The catalyst and heavy metals can be separated from either the mixtures in line 28 or washed from the carbonates in line 29 by well-known means.

It will be obvious to those skilled in the art that numerous variations in the process steps above set forth may be made without departing from the scope of the present invention. For example, the hydrocarbons may enter the reactor through a variety of mechanisms that produce drops, dust, or streams so long as they are placed in such manner so that they ride on the surface of the flowing stream of heat transfer medium and an intimate mixture of the hydrocarbon and heat transfer medium is avoided. Temperature and pressure variations in the reactors and condensers are interrelated and may be varied in a manner well known to those skilled in the art. Operational details, such as protective atmospheres, heat exchangers, etc., have not been extensively described since they form no part of the present invention and their operation is familiar to those skilled in the art.

Experiments were conducted in a pilot scale plant to assess the performance of the first stage thermal catalytic cracking in thermal reaction zone 1 of the process. The pilot plant was designed to process up to 15 barrels per day of heavy crude in a reactor with full-size components (operating at proportionately reduced rates). In a typical test, a 0.45 $m^3$ horizontal reactor was charged with a continuous flow of heat transfer liquid (NaOH) at 10 l/m at 450 C and one bar pressure. A heavy crude mixed with sodium molybdate catalyst equivalent to 1.0 wt. % $MoS_2$ was placed on the NaOH in the form of small drops at the rate of 0.714l/min. The input crude had the following general characteristics: API 12.8, Sulfur 3.87%, kinematic viscosity 590 cSt, asphaltene 8.3%, Fe 3.16 ppm, Ni 58.2 ppm, and V 108 ppm. The product vapors were cooled, and liquid and solid samples were collected. Over the sampling interval, 72% of the input volume of crude was recovered as high-value hydrocarbon liquid, and a mass balance indicated 22.4% solids (coke, catalyst, heavy metals), and 11.7% non-condensable vapors (light hydrocarbons) left the reactor. The product liquids had the following general characteristics: API 26.4, Sulfur 2.18%, kinematic viscosity 4.23 cSt, while asphaltenes and the heavy metals content were less than fractions of one ppm.

The entire system shown in FIG. 1 formed the basis of computer-aided process flow sheet simulations, allowing projections to be made for the overall material and energy balances to be expected during full-scale operation. For example, for a projected heavy hydrocarbon processing rate of 1000 barrels per day (bpd), 720 bpd of liquids upgraded to API 26.4 would be produced directly according to pilot plant measurements. By processing the mixture from line 6a in the subsequent carbothermic process previously described, a further 152 bpd of API 57.00 liquids could be produced in the Fischer-Tropsch unit (item 15 on FIG. 1). A blended product production rate of 872 bpd of API 31.0 liquids would result. Energy released is used partially for process heat requirements, with excess energy used to generate steam projected to have a thermal value of 13.3 megawatts As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for converting feedstock into liquid hydrocarbon fuel condensate comprising the steps of:
    a) providing a feedstock for producing liquid hydrocarbon fuel, wherein said feedstock is chosen from the group including in whole or in part: biomass, bitumen, crude oil, oil shale, tar, coal,
    b) providing a heated heat transfer medium flow having a flow surface, said flow flowing through at least one thermal reaction zone under substantially carbon rejection process conditions,
    c) placing said feedstock onto said heated heat transfer medium flow so that said feedstock substantially rides on said flow surface of said heated heat transfer medium flow without substantially any mixing of said feedstock with said heat transfer medium flow under said substantially carbon rejection process conditions,
d) vaporizing at least a portion of said feedstock to form vapours while said feedstock is in said at least one thermal reaction zone by heat transfer to said feedstock from a heat transfer medium in said heat transfer medium flow, while leaving unvaporized by-products including an unvaporized remainder portion of said feedstock,
e) condensing said vapours into a liquid hydrocarbon fuel condensate,
f) collecting said condensate.

2. The process of claim 1 further comprising the steps of mixing a catalyst with said feedstock to produce an admixture and then placing said admixture, instead of said placing said feedstock, onto said heated heat transfer medium flow, and recovering at least a portion of said catalyst from said unvaporized by-products.

3. The process of claim 2 further comprising the step of:
reacting in a thermo-chemical reaction at least a portion of said heat transfer medium and at least a portion of said remainder portion of said admixture so as to generate gas.

4. The process of claim 3 further comprising the steps of:
regenerating said heat transfer medium to produce a regenerated heat transfer medium,
returning said regenerated heat transfer medium to an upstream end of said at least one thermal reaction zone for feeding into said at least one thermal reaction zone as at least a portion of said heat transfer medium flow.

5. The process of claim 2 wherein said catalyst is a coking catalyst to cause coking.

6. The process of claim 5 wherein, if said feedstock is initially in a solid state, then the process further comprises the additional step of converting the feedstock to a slurry prior to the step of placing the admixture onto the heat transfer medium.

7. The process of claim 6 wherein the step of converting the feedstock to a slurry includes converting the feedstock to particulate and adding liquid organic material.

8. The process of claim 5 wherein said coking catalyst is chosen from the group comprising water soluble salts, oil soluble salts, alkali metal salts, metal salts, metal oxides, metal sulfides, metal nitrides, metal carbonates, metal organic compounds, and mixtures thereof.

9. The process of claim 8 wherein said group comprises alkalimetal salts, metal organic compounds, and metal salts.

10. The process of claim 9 wherein said metal salts comprise molybolenum, nickel, and vanadium compounds.

11. The process of claim 10 wherein said coking catalysts are recovered as respectively sodium molybolate, sodium vanadate, nickel oxide, and added to said feedstock as recycled said feedstock.

12. The process of claim 2 wherein said placing of said admixture onto said heat transfer medium includes applying said admixture as a flow, wherein said flow includes applying said admixture as droplets, dust or at least one stream.

13. The process of claim 12 wherein said coking catalyst is a particulate so as to flow with said feedstock in said admixture.

14. The process of claim 2 wherein said mixing step is under temperature conditions in the range of substantially zero degrees Celsius to 200 degrees Celsius, and is under pressure conditions in the range of substantially zero psia to 100 psia.

15. The process of claim 14 wherein said steps of placing and vaporizing in said at least one thermal reaction zone are performed in the temperature range of substantially 300 degrees Celsius to 600 degrees Celsius, under pressure in the range of substantially 5 psia to 100 psia.

16. The process of claim 15 wherein said temperature range is substantially 380-450 degrees Celsius, and wherein said pressure range is substantially 5-30 psia.

17. The process of claim 2 wherein said catalyst is a coking catalyst to cause coking, and wherein said catalyst and said feedstock include materials which are common between said catalyst and said feedstock so that at least one of said materials is found in both said catalyst and said feedstock.

18. The process of claim 17 wherein said materials which are common between both said coking catalyst and said feedstock include metals.

19. The process of claim 17 wherein said materials are recovered from said admixture following said vaporizing of at least a portion of said feedstock in said admixture.

20. The process of claim 19 further comprising the steps of recycling after said recovery at least said materials in said coking catalyst for re-use in said admixture in said placing of said admixture onto said heated transfer medium flow.

21. The process of claim 2 wherein said at least one thermal reaction zone includes a first thermal reaction zone having an upstream end and an opposite downstream end, and wherein said admixture is placed as a substantially continuous flow onto said heat transfer medium flow at said upstream end and travels on said upper flow surface downstream to said downstream end, wherein said placing of said admixture as a continuous flow includes applying said admixture as drops, dust or as at least one stream.

22. The process of claim 21 wherein said heat transfer medium includes molten alkali metal salts.

23. The process of claim 22 wherein said molten alkali metal salts are chosen from the group comprising alkali metal hydroxies, alkali metal nitrides, alkali metal carbonates, alkali metal chlorides, eutectic mixtures of alkali metal salts.

24. The process of claim 23 wherein said heat transfer medium includes primarily sodium hydroxide.

25. The process of claim 21 further comprising a second thermal reaction zone downstream of and cooperating with said first thermal reaction zone for accepting heated said admixture from said downstream end of said first thermal reaction zone, and wherein, when said feedstock is primarily biomass, said second thermal reaction zone is heated to a temperature range of substantially between 400 and 900 degrees Celsius.

26. The process of claim 25 wherein said temperature range in said second thermal reaction zone is between 750 and 850 degrees Celsius.

27. The process of claim 2 wherein said at least one thermal reaction zone includes a succession of thermal reaction zones cooperating with one another for transporting downstream consecutively therethrough said admixture and said heat transfer medium, and wherein, in a downstream thermal reaction zone downstream of an upstream-most thermal reaction zone, said admixture and said heat transfer medium are mixed together and heated to create a carbothermic reduction reaction.

28. The process of claim 27 wherein said heat transfer medium includes that chosen from the group comprising molten metals and molten alkali metal salts, and wherein said downstream thermal reaction zone is heated to a temperature range of substantially 900 to 1200 degrees Celsius so as to create hydrogen, carbon monoxide and alkali metal vapour.

29. The process of claim 28 wherein said temperature range is 1000-1190 degrees Celsius.

30. The process of claim 28 wherein said heat transfer medium is comprised in part of molten alkali metal carbonate.

31. The process of claim 30 wherein said molten alkali metal carbonate is sodium carbonate.

32. The process of claim 28 further comprising the step of generating heat in a further recovery zone, wherein said alkali metal vapour is removed to said further recovery zone and reacted with water.

33. The process of claim 32 wherein said heat is used to produce steam.

34. The process of claim 32 wherein said reaction with water creates hydrogen gas and wherein said downstream thermal reaction zone creates further hydrogen gas and carbon monoxide gas, and further comprising the step of evacuating said hydrogen gases and carbon monoxide gas to a Fisher-Tropsch reactor and converting therein said gases to liquid fuel.

35. A process for converting feedstock into liquid hydrocarbon fuel condensate comprising the steps of:
  a) providing a feedstock for producing liquid hydrocarbon fuel, wherein said feedstock is chosen from the group including in whole or in part: biomass, bitumen, crude oil, oil shale, tar, coal;
  b) mixing a catalyst with said feedstock to produce an admixture,
  c) providing a heated heat transfer medium flow having a flow surface, said flow flowing through at least one thermal reaction zone under substantially carbon rejection process conditions,
  d) placing said admixture onto said heated heat transfer medium flow so that said admixture substantially rides on said flow surface of said heated heat transfer medium flow without substantially any mixing of said admixture with said heat transfer medium flow under said substantially carbon rejection process conditions,
  e) vaporizing at least a portion of said feedstock in said admixture to form vapours while said admixture is in said at least one thermal reaction zone by heat transfer to said admixture from a heat transfer medium in said heat transfer medium flow, while leaving unvaporized by-products including an unvaporized remainder portion of said feedstock,
  f) condensing said vapours into a liquid hydrocarbon fuel condensate,
  g) collecting said condensate,
  h) recovering at least a portion of said catalyst from said unvaporized by-products.

36. The process of claim 35 further comprising the step of:
reacting in a thermo-chemical reaction at least a portion of said heat transfer medium and at least a portion of said remainder portion of said admixture so as to generate gas.

37. The process of claim 36 further comprising the steps of:
regenerating said heat transfer medium to produce a regenerated heat transfer medium,
returning said regenerated heat transfer medium to an upstream end of said at least one thermal reaction zone for feeding into said at least one thermal reaction zone as at least a portion of said heat transfer medium flow.

38. The process of claim 35 wherein said catalyst is a coking catalyst to cause coking.

39. The process of claim 38 wherein, if said feedstock is initially in a solid state, then the process further comprises the additional step of converting the feedstock to a slurry prior to the step of placing the admixture onto the heat transfer medium.

40. The process of claim 39 wherein the step of converting the feedstock to a slurry includes converting the feedstock to particulate and adding liquid organic material.

41. The process of claim 38 wherein said coking catalyst is chosen from the group comprising water soluble salts, oil soluble salts, alkali metal salts, metal salts, metal oxides, metal sulfides, metal nitrides, metal carbonates, metal organic compounds, and mixtures thereof.

42. The process of claim 41 wherein said group comprises alkalimetal salts, metal organic compounds, and metal salts.

43. The process of claim 42 wherein said metal salts comprise molybolenum, nickel, and vanadium compounds.

44. The process of claim 43 wherein said coking catalysts are recovered as respectively sodium molybolate, sodium vanadate, nickel oxide, and added to said feedstock as recycled said catalyst.

45. The process of claim 35 wherein said placing of said admixture onto said heat transfer medium includes applying said admixture as a flow, wherein said flow includes applying said admixture as droplets, dust or at least one stream.

46. The process of claim 45 wherein said coking catalyst is a fine particulate so as to flow with said feedstock in said admixture.

47. The process of claim 35 wherein said mixing step is under temperature conditions in the range of substantially zero degrees Celsius to 200 degrees Celsius, and is under pressure conditions in the range of substantially zero psia to 100 psia.

48. The process of claim 47 wherein said steps of placing and vaporizing in said at least one thermal reaction zone are performed in the temperature range of substantially 300 degrees Celsius to 600 degrees Celsius, under pressure in the range of substantially 5 psia to 100 psia.

49. The process of claim 48 wherein said temperature range is substantially 380-450 degrees Celsius, and wherein said pressure range is substantially 5-30 psia.

50. The process of claim 35 wherein said catalyst is a coking catalyst to cause coking, and wherein said catalyst and said feedstock include materials which are common between said catalyst and said feedstock so that at least one of said materials is found in both said catalyst and said feedstock.

51. The process of claim 50 wherein said materials which are common between both said coking catalyst and said feedstock include metals.

52. The process of claim 50 wherein said materials are recovered from said admixture following said vaporizing of at least a portion of said feedstock in said admixture.

53. The process of claim 52 further comprising the steps of recycling after said recovery at least said materials in said coking catalyst for re-use in said admixture in said placing of said admixture onto said heated transfer medium flow.

54. The process of claim 35 wherein said at least one thermal reaction zone includes a first thermal reaction zone having an upstream end and an opposite downstream end, and wherein said admixture is placed as a substantially continuous flow onto said heat transfer medium flow at said upstream end and travels on said upper flow surface downstream to said downstream end, wherein said placing of said admixture as a continuous flow includes placing said admixture as drops, dust or as at least one stream.

55. The process of claim 54 wherein said heat transfer medium includes molten alkali metal salts.

56. The process of claim 55 wherein said molten alkali metal salts are chosen from the group comprising alkali metal hydroxies, alkali metal nitrides, alkali metal carbonates, alkali metal chlorides, eutectic mixtures of alkali metal salts.

57. The process of claim 56 wherein said heat transfer medium includes primarily sodium hydroxide.

58. The process of claim 54 further comprising a second thermal reaction zone downstream of and cooperating with said first thermal reaction zone for accepting heated said admixture from said downstream end of said first thermal reaction zone, and wherein, when said feedstock is primarily biomass, said second thermal reaction zone is heated to a temperature range of substantially between 400 and 900 degrees Celsius.

59. The process of claim 58 wherein said temperature range in said second thermal reaction zone is between 750 and 850 degrees Celsius.

60. The process of claim 35 wherein said at least one thermal reaction zone includes a succession of thermal reaction zones cooperating with one another for transporting downstream consecutively therethrough said admixture and said heat transfer medium, and wherein, in a downstream thermal reaction zone downstream of an upstream-most thermal reaction zone, said admixture and said heat transfer medium are mixed together and heated to create a carbothermic reduction reaction.

61. The process of claim 60 wherein said heat transfer medium includes that chosen from the group comprising molten metals and molten alkali metal salts, and wherein said downstream thermal reaction zone is heated to a temperature range of substantially 900 to 1200 degrees Celsius so as to create hydrogen, carbon monoxide and alkali metal vapour.

62. The process of claim 61 wherein said temperature range is 1000-1190 degrees Celsius.

63. The process of claim 61 wherein said heat transfer medium is comprised in part of molten alkali metal carbonate.

64. The process of claim 63 wherein said molten alkali metal carbonate is sodium carbonate.

65. The process of claim 61 further comprising the step of generating heat in a further recovery zone, wherein said alkali metal vapour is removed to said further recovery zone and reacted with water.

66. The process of claim 65 wherein said heat is used to produce steam.

67. The process of claim 65 wherein said reaction with water creates hydrogen gas and wherein said downstream thermal reaction zone creates further hydrogen gas and carbon monoxide gas, and further comprising the step of evacuating said hydrogen gases and carbon monoxide gas to a Fisher-Tropsch reactor and converting therein said gases to liquid fuel.

* * * * *